UNITED STATES PATENT OFFICE.

FELIX KLINGEMANN AND GEORG KALISCHER, OF FRANKFORT-ON-THE-MAIN, GERMANY, ASSIGNORS TO CASSELLA COLOR COMPANY, OF NEW YORK, N. Y.

RED AZO DYE AND PROCESS OF MAKING SAME.

No. 807,119.      Specification of Letters Patent.      Patented Dec. 12, 1905.

Application filed August 21, 1905. Serial No. 275,166.

*To all whom it may concern:*

Be it known that we, FELIX KLINGEMANN and GEORG KALISCHER, doctors of philosophy, citizens of Prussia, and residents of Frankfort-on-the-Main, in the Province of Hesse-Nassau and Kingdom of Prussia, Germany, have invented certain new and useful Improvements in the Process of Making Red Azo Dyes, of which the following is a specification.

Our present invention is based upon our discovery that the monoazo dyes formed by combining the diazo compounds of aromatic amidoaldehydes with the sulfo acids of alpha and beta naphthol can be condensed in acid solution with the 1-2-diamido-naphthalene-5-hydroxy-7.sulfonic acid in the proportion of two molecules to one to form the diazo coloring-matters of the following constitution,

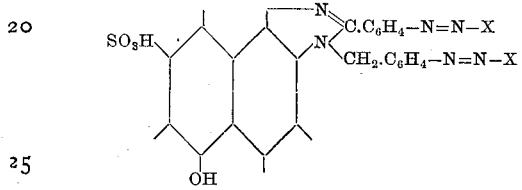

in which X represents a mono- or disulfonic-acid of alpha- or beta-naphthol. These diazo coloring-matters which in themselves are of no great value can be transformed into highly valuable products by combining them in alkaline solution with one molecule of an aromatic diazo compound. The new azo coloring-matters thus obtained are of a brilliant red color, the shade of which varies from a yellowish red to a bluish red, according to the naphtholsulfonic acid and to the diazo compound used in the preparation of the dyestuff. They have a strong affinity for cotton. The dyes obtained with them are of great fastness to washing and to acids. In the dry state they represent powders of a reddish-brown shade. They are soluble in water with a red color. Acids precipitate the dyestuffs from these solutions.

The following example will serve to further illustrate the manner in which our invention can be carried out. The parts are by weight: 24.2 parts of meta-amidobenzaldehyde are diazotized in the usual manner with seventy parts of hydrochloric acid of 20° Baumé and fourteen parts of sodium nitrite. The cold diazo solution is poured into the cold solution of fifty parts of the sodium salt of 2.6-naphtholsulfonic acid and of sixty parts of dry sodium carbonate. The dyestuff is filtered off and is dissolved in one thousand parts of boiling water. To this solution is added the solution of 25.4 parts of 1.2.diamido-naphthalene-5.hydroxy.7-sulfonic acid with fourteen parts of sodium acetate. The mixture being boiled for half an hour is then acidified by means of hydrochloric acid, and the boiling is continued for half an hour. The red precipitate thus formed is filtered off and is dissolved in two thousand four hundred parts of boiling water, to which are added forty parts of dry sodium carbonate. The solution is cooled down with ice, and the diazo compound formed by diazotizing 9.3 parts of anilin with thirty-five parts of hydrochloric acid and seven parts of sodium nitrite is then allowed to run in. The coloring-matter is formed in a few minutes. As soon as the diazo compound has disappeared the solution is lightly heated and the coloring-matter separated by common salt. It is filtered off, pressed, and dried.

Instead of the 2.6.naphtholsulfonic acid other mono or disulfonic acids of alpha or beta naphthol may be used. The anilin may be substituted by other aromatic bases.

Instead of condensing one molecule of 1.2-diamido-5-hydroxy-7-sulfonic acid with two molecules of the same aldehydeazo dye two molecules of two different aldehydeazo dyestuffs may be used. Thus one molecule of 1-2-diamidonaphthalene-5-hydroxy-7-sulfonic acid can be condensed with one molecule of the dyestuff prepared from meta-amido-benzaldehyde and 2-6-naphtholsulfonic acid and with one molecule of the azo dye prepared from meta-amido-benzaldehyde and 1-4-naphtholsulfonic acid. This condensation product can then be combined in alkaline solution with one molecule of an aromatic diazo compound, such as diazo-benzene, diazo-ortho toluene, &c.

Having now described our invention and the manner of performing the same, what we claim is—

1. The herein-described process of making disazo dyestuffs, which consists in condensing in aqueous solution one molecule of 1.2-diamidonaphthalene-5-hydroxy-7-sulfonic acid with two molecules of a monoazo dyestuff prepared from the diazo compound of meta-amido-benzaldehyde and a naphtholsulfonic acid in the manner hereinbefore described, substantially as described.

2. The herein-described process of making disazo dyestuffs, which consists in condensing in aqueous solution one molecule of 1-2-diamidonaphthalene-5-hydroxy-7-sulfonic acid with two molecules of two different monoazo dyestuffs prepared from the diazo compound of meta-amido-benzaldehyde and a naphtholsulfonic acid in the manner hereinbefore described, substantially as described.

3. The herein-described process of making trisazo dyestuffs, which consists in combining an aromatic diazo compound in alkaline solution with the products obtained by condensing in aqueous solution one molecule of 1-2-diamidonaphthalene-5-hydroxy-7-sulfonic acid with two molecules of a monoazo dyestuff containing an aldehyde group, the latter being formed by combining one molecule of diazotized meta-amido-benzaldehyde with one molecule of a naphtholsulfonic acid, substantially as described.

4. The trisazo coloring-matters obtained by combining in an alkaline solution one molecule of an aromatic diazo compound with one molecule of the products of condensation obtained by condensing in aqueous solution one molecule of 1-2-diamidonaphthalene-5-hydroxy-7-sulfonic acid with two molecules of a monoazo dyestuff containing an aldehyde group, the latter being formed by combining one molecule of diazotized meta-amido-benzaldehyde with one molecule of a naphtholsulfonic acid, the said trisazo coloring-matters representing in the dry state powders of a reddish-brown shade, soluble in water with a red color, dissolving in concentrated sulfuric acid with a bluish-red color which changes into a more yellowish shade by adding water, and dyeing unmordanted cotton red shades, substantially as described.

Signed at Frankfort-on-the-Main, in the Province of Hesse-Nassau and Kingdom of Prussia, Germany, this 31st day of July, A. D. 1905.

FELIX KLINGEMANN.
GEORG KALISCHER.

Witnesses:
JEAN GRUND,
CARL GRUND.